(12) United States Patent
Belloni et al.

(10) Patent No.: US 10,141,126 B2
(45) Date of Patent: Nov. 27, 2018

(54) VIBRATION-LIMITING DEVICE FOR AN APPARATUS COMPRISING A SWITCHGEAR AND A SWITCHING DEVICE, SUCH AS A CIRCUIT BREAKER, AND APPARATUS COMPRISING SAID VIBRATION-LIMITING DEVICE

(71) Applicant: ABB Schweiz AG, Baden (CH)

(72) Inventors: Francesco Belloni, Bergamo (IT); Andrea Farina, Monza (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/651,685

(22) Filed: Jul. 17, 2017

(65) Prior Publication Data
US 2018/0019074 A1    Jan. 18, 2018

(30) Foreign Application Priority Data

Jul. 15, 2016 (EP) ..................................... 16179728

(51) Int. Cl.
*H01H 3/00* (2006.01)
*H01H 1/50* (2006.01)
(Continued)

(52) U.S. Cl.
CPC ................ *H01H 1/50* (2013.01); *H01H 1/38* (2013.01); *H01H 1/58* (2013.01); *H01H 3/00* (2013.01); *H02B 11/04* (2013.01)

(58) Field of Classification Search
CPC ............... H01H 31/003; H01H 33/666; H01H 33/6661; H01H 33/66207; H01H 1/5822;
(Continued)

(56) References Cited

U.S. PATENT DOCUMENTS

| 8,641,437 B2 * | 2/2014 | Tu ........................... H01H 1/385 439/251 |
| 2011/0299226 A1 * | 12/2011 | Milovac ................. H02B 11/00 361/605 |

(Continued)

FOREIGN PATENT DOCUMENTS

| JP | S4988225 | 7/1974 |
| JP | H0527920 | 4/1993 |
| JP | 2000182722 | 6/2000 |

OTHER PUBLICATIONS

European Search Report for Application Serial No. 16179728.7, completed Dec. 13, 2016, 9 pages

*Primary Examiner* — Truc Nguyen
(74) *Attorney, Agent, or Firm* — Taft Stettinius & Hollister LLP; J. Bruce Schelkopf

(57) ABSTRACT

An apparatus comprises a switchgear having at least one couple of stationary conducting terminals and a switching device, such as a circuit breaker, having at least one couple of corresponding movable conducting terminals. The switching device is movable with respect to the switchgear along a connection/disconnection direction between a connection position, wherein the switching device is electrically and mechanically connected to the switchgear by engagement of the movable conducting terminals with the corresponding stationary contacting terminals by means of contact assemblies coupled either to the movable conducting terminals or to the stationary conducting terminals, and a disconnection position, wherein the switching device and the switchgear are electrically and mechanically disconnected. The apparatus further comprises at least one vibration-limiting device integrally coupled to either one movable conducting terminal of said at least one couple of movable conducting terminals or to one corresponding stationary conducting terminal of said at least one couple of stationary (Continued)

conducting terminals and conformed such that: when the switching device is approaching the connection position moving along said connection/disconnection direction, the vibration-limiting device does not interfere with the other of the one movable conducting terminal or the one corresponding stationary conducting terminal; when the switching device is in the connection position, in case of vibrations of the one movable conducting terminal transversal to said connection/disconnection direction, the vibration-limiting device interferes with the other of the one movable conducting terminal or the one corresponding stationary conducting terminal so to limit the vibrations amplitude.

20 Claims, 3 Drawing Sheets

(51) Int. Cl.
*H01H 1/58* (2006.01)
*H01H 1/38* (2006.01)
*H02B 11/04* (2006.01)

(58) Field of Classification Search
CPC ... H01H 2033/6623; H01H 2033/6668; H01H 33/38; H01H 33/6606; H01H 33/022; H01H 33/16; H01H 9/342; H01H 33/22; H01H 33/6662
See application file for complete search history.

(56) References Cited

U.S. PATENT DOCUMENTS

| | | | |
|---|---|---|---|
| 2013/0048476 A1* | 2/2013 | Kim | H01H 1/385 200/50.21 |
| 2013/0146433 A1* | 6/2013 | Reuber | H01H 1/385 200/48 R |
| 2014/0287602 A1* | 9/2014 | Pons Gonzalez | H01R 13/6205 439/39 |
| 2015/0294804 A1* | 10/2015 | Cortinovis | H01H 1/38 200/279 |
| 2016/0035501 A1* | 2/2016 | Nukaga | H01H 1/385 200/252 |

* cited by examiner

VIBRATION-LIMITING DEVICE FOR AN APPARATUS COMPRISING A SWITCHGEAR AND A SWITCHING DEVICE, SUCH AS A CIRCUIT BREAKER, AND APPARATUS COMPRISING SAID VIBRATION-LIMITING DEVICE

BACKGROUND

Technical Field

The present invention relates to the electrical and mechanical connection of a switching device, such as a circuit-breaker, and of a switchgear. In particular, the present invention relates to a vibration-limiting device for limiting the amplitude of vibrations of a switching device due to the Lorentz forces when the switching device is connected to the switchgear.

Description of the Related Art

In the medium voltage field (which commonly refers to voltages from 1 kV to some tens of kV), it is known the use of the so called tulip-contact-assemblies for the mechanical and electrical connection of movable conducting terminals provided on a draw-out circuit breaker to stationary conducting terminals of a switchgear.

The tulip-contact-assembly comprises a support frame which is defined by a pair of annular plates which are mutually parallel and spaced apart and which are fixed to one other by rods. The tulip-contact-assembly further comprises a plurality of contact-finger-elements which rest into seat-portions of the flanges and are urged radially against the latter by helical springs extending with a ring-shape around a central axis of the support frame.

Each contact-finger-element has an oblong shape extending along a longitudinal axis parallel to the above mentioned central axis, and comprises a front contact portion for removably engaging with a stationary contact-pin of the switchgear, and a rear contact portion intended to keep in contact with a conducting-arm of the movable circuit breaker.

In presence of short circuits, Lorentz forces are generated which in turn cause vibrations and displacements in the circuit breaker, in particular on the movable conducting terminals thereof. If the conducting terminals of each phase are vertically aligned, the upper movable conducting terminals may be subjected to vibrations with very high amplitudes. As a consequence, one or more contact-finger elements may lose contact with the stationary contact-pin, with the consequent risk of electric arcs. This may compromise the reliability and the safety of the whole system.

In order to increase the robustness and the stability of the system, it is known to provide the circuit breaker with two lower pins to be inserted in corresponding holes of the switchgear. However, this arrangement is not sufficient to avoid the risk that specially the upper tulip-contact assemblies lose the electrical connection with the switchgear stationary pins.

The same problem may occur in the case contact-assemblies other than tulip-contact assemblies are used, such as contact-assemblies of the gripper type.

BRIEF SUMMARY OF THE INVENTION

The problem underlying the present invention is therefore to provide a vibration-limiting device which can be associated to an apparatus comprising a switchgear and a switching device, such as a circuit breaker, suitable for limiting the amplitude of vibrations of the switching device due to the Lorentz forces when the switching device is connected to the switchgear.

This problem is solved by an apparatus according to claim 1, by a vibration-limiting device according to claim 13 and by a contact assembly according to claim 17.

Dependent claims define possible advantageous embodiments of the invention.

BRIEF DESCRIPTION OF THE DRAWINGS

Further characteristics and advantages of the invention will be more apparent from the following description of preferred embodiments and of their alternatives given as a way of an example with reference to the enclosed drawings in which.

DETAILED DESCRIPTION OF THE INVENTION

In the following description, same alphanumeric references are used for analogous exemplary elements when they are depicted in different drawings.

Figures 1A, 1B:
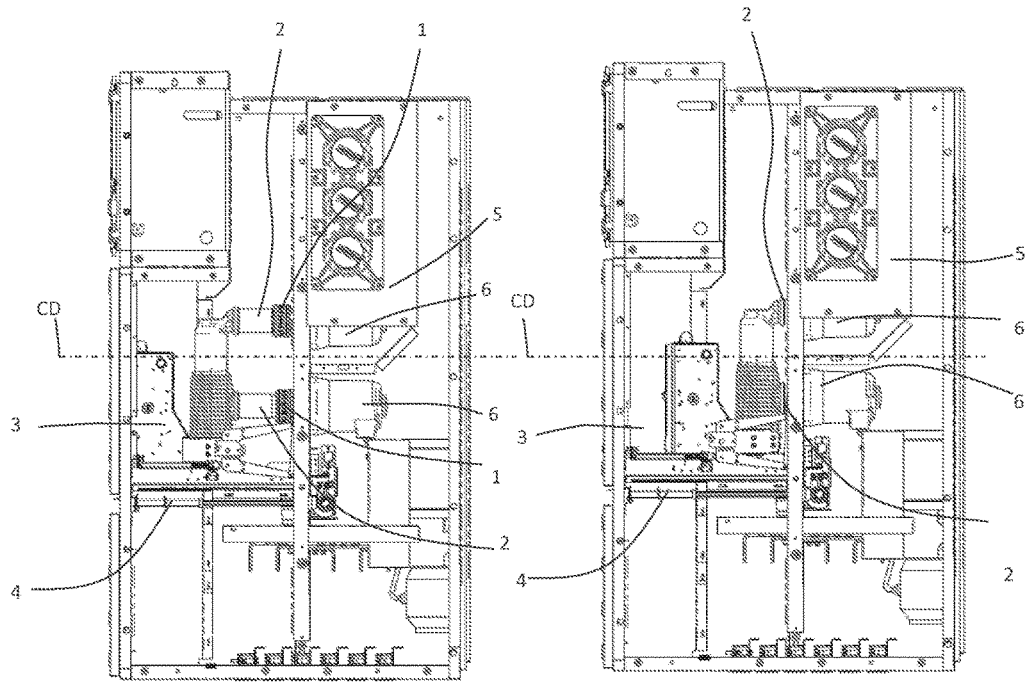
FIGS. 1a and 1b are side views of a circuit breaker and a switchgear, respectively in a disconnected configuration and in a connected configuration.
Figure 2:
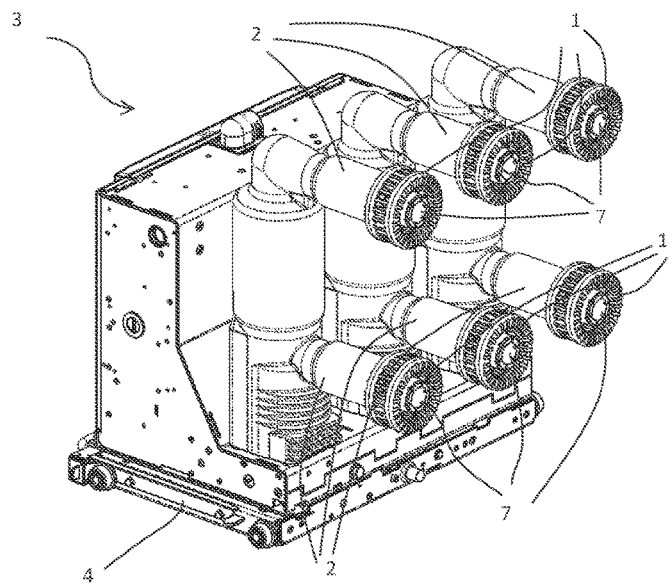
FIG. 2 is a perspective view of a switchgear comprising a plurality of vibration-limiting devices according to the invention.
Figure 3:
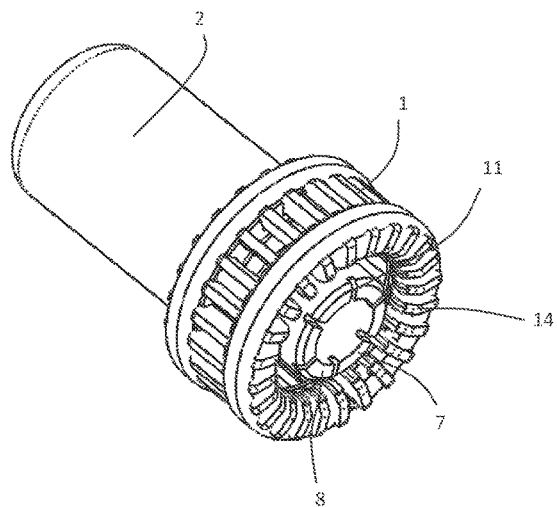
FIG. 3 is a perspective view of a conducting terminal provided with a vibration limiting device according to the invention.

Referring to FIG. 1a-1b, a switching device, such as a circuit breaker, is indicated with reference number 3, and a switchgear is indicated with reference number 5. The switching device 3 can be in particular a draw-out circuit breaker which can be housed in the switchgear 5. Such a circuit breaker 3, in a non-limitative way, is preferably of the type which is supported by a motorized trolley 4 that can move along a connection/disconnection direction CD from an extraction position with respect to the switchgear 5 (FIG. 1a), in which movable conducting terminals 2 of the circuit breaker 3 (such as contact-arms or conducting-bushings) are disconnected from corresponding stationary conducting terminals 6 of the switchgear 5 (such as stationary-conducting-pins), to an insertion position in the switchgear 5 (FIG. 1b), in which the movable conducting terminals 2 are connected to the corresponding stationary conducting terminals 6. The extraction position corresponds to a mechanical and electrical disconnection position, whilst the insertion position corresponds to a connection position.

In the embodiments shown in the Figures, the switchgear 5 and the circuit breaker 3 are of the multiphase-type, in particular of the three-phase type. Therefore, each of them comprises three couples of respective conducting terminals. However, as will be clear to the skilled person, according to a further possible embodiment, the switchgear 5 and the circuit breaker 3 can be of the one-phase type. In this case, each of the switchgear 5 and the circuit breaker 3 comprises a single couple of respective conducting terminals.

Contact-assemblies 1 can be fixed to each of the conducting terminals 2 mounted on and movable together with the circuit breaker 3 and are suitable to engage with the stationary conducting terminals 6 of the switchgear 5. However, in an alternative further possible embodiment (not shown in the Figures), the contact-assemblies 1 can also be assembled on the stationary conducting terminals 6 of the switchgear 5 in order to receive, and engage with, the movable conducting terminals 2 of the circuit breaker 3. According to the embodiments shown in the Figures, contact assemblies are preferably of the tulip type. However, the contact assemblies can be differently shaped. In particular, they can be gripper-shaped, for example for the connection of the gripper to a conducting bus bar instead of a cylindrical terminal. A gripper-contact-assembly comprises a first group and a second group of contact-finger-elements opposite to the first group of contact-finger-elements. In each of the first and the second group, the contact-finger-elements are placed side by side parallel one to another.

At least one vibration-limiting device 7 is provided which is integrally coupled to one movable conducting terminal 2 of the switching device 3 or to one stationary conducting terminal 6 of the switchgear. With reference to the exemplary embodiment shown in the Figures, there is provided a vibration-limiting device 7 associated to each movable conducting terminal 2 of each phase of the switching device 3. However, it is alternatively possible that only some of the movable conducting terminals 2 are provided with respective vibration-limiting devices 7. In particular, in the case the movable conducting terminals 2 of each phase are vertically aligned, the vibration-limiting device is associated at least to the upper movable conducting terminal of each phase, where the vibrations due to the Lorentz forces are higher. Alternatively, according to an alternative embodiment not shown in the Figures, the vibration-limiting devices 7 can be associated to the stationary conducting terminal 6 of the switchgear 5. Of course, the vibration limiting devices 7 can alternatively be associated in a different manner and in different number to only some movable conducting terminals 2 and/or to only some stationary conducting terminals 6.

According to a possible embodiment of the invention, each vibration-limiting device 7 is conformed so to form a gap δ with the stationary conducting terminal 6 (if the vibration-limiting device 7 is coupled to the corresponding movable conducting terminal 2) or with the movable conducting terminal 2 (if the vibration-limiting device 7 is coupled to the corresponding stationary conducting terminal 6), both during the approaching of the switching device 3 towards the connection position by moving along the connection/disconnection direction CD, and when the switching device 3 is in the connection position. In this manner, when the switching device 3 is approaching the connection position, the vibration-limiting device 7 does not touch and therefore does not interfere with the stationary conducting terminal 6 (if the vibration-limiting device is coupled to the corresponding movable conducting terminal 2) or with the movable conducting terminal 2 (if the vibration-limiting device is coupled to the corresponding stationary conducting terminal 6). Therefore, the racking-in force necessary to couple each movable contacting terminal with the corresponding stationary conducting terminal is not affected.

On the other hand, when the switching device 3 is in the connection position, in case of vibrations (due to the Lorentz forces in presence of a short circuit) of the movable switching device 3 and, as a consequence, of the movable conducting terminals 2 thereof in directions which are transversal to the connection/disconnection direction CD, the vibration-limiting device 7 interferes with the stationary conducting terminal 6 (if the vibration-limiting device 7 is coupled to the corresponding movable conducting terminal 2, which is vibrating), or with the vibrating movable conducting terminal 2 (if the vibration-limiting device 7 is coupled to the corresponding stationary conducting terminal 6), so to limit the vibrations amplitude within said gap.

In order to better understand the main idea underlying the present invention, reference is made to the exemplary embodiment shown in the FIGS. 2-5. According to this embodiment, each vibration-limiting device 7 is integrally coupled, i.e. is coupled so to be integrally movable with, a respective movable conducting terminal 2 of the switching device 3 and is configured to interfere with the corresponding stationary conducting terminal 6 of the switchgear 5 in case of vibrations of the switching device 3. To this purpose, the vibration-limiting device 7, advantageously, comprises a cylindrical portion 8 suitable to be at least partially housed in an end cavity 9 of the corresponding stationary conducting terminal 6. The cylindrical portion 8 external diameter is smaller than the end cavity 9 inner diameter and these diameters are such that when the vibration-limiting device 7 cylindrical portion 8 is in or is being inserted into the stationary conducting terminal 6 end cavity 9, the vibration-limiting device 7 cylindrical portion 8 external wall and the stationary conducting terminal 6 end cavity 9 internal wall there is air corresponding to the above-mentioned gap δ, considered in a radial direction with respect to the connection/disconnection direction CD. Therefore, when the switching device 3 is approaching the connection position with respect to the switchgear 5 (FIG. 5a), the vibration-limiting device 7 cylindrical portion 8 enters into the stationary conducting terminal 6 end cavity 9 without entering in contact with the stationary conducting terminal 6 itself, in particular with its internal wall. On the other hand, when the switching device 3 is in the connection position (FIG. 5b), in case of vibrations of the latter, for example in radial direction or, more generally, in a transversal direction with respect to the connection/disconnection direction CD, the vibration amplitude cannot exceed the afore-mentioned gap δ because the vibration limiting device 7 cylindrical portion 8 enters in contact with the stationary conducting terminal 6 end cavity 9 inner wall. As a consequence, the displacement of each contact-finger-element 14 of the tulip-contact assembly 1 associated to the same movable conducting terminal 2 as the vibration limiting device 7 with respect to the stationary conducting terminal 6 is also limited.

Of course, the vibration-limiting device 7 portion 8 and the stationary conducting terminal 6 end cavity 9 may have shapes other than cylindrical, provided that a gap is provided as discussed with the above cited embodiments. In this case, the gap δ can be obtained by suitably dimensioning vibration-limiting device 7 external dimensions and stationary conducting terminal 6 end cavity 9 inner wall dimensions.

It is further to be noted that, according to a further possible embodiment not shown in the Figures, the vibration-limiting device 7 may be alternatively conformed such that the vibrating limiting device itself comprises a portion having a cylindrical end cavity, where the stationary conducting terminal can be inserted. In this case, the vibration limiting device has an inner diameter (or, more in general, one or more inner dimensions) greater than the stationary conducting terminal external diameter or external dimensions, such that the forming of the gap is still possible.

It is further to be noted that, according to still another possible embodiment, the gap δ can be missing or be substantially equal to zero in the connection position. Moreover, the gap δ can be variable during the approaching of the switching device to the connection position. For example, the stationary or the movable conducting terminals and the vibration-limiting device end cavity can be frustoconical such that the gap δ is substantially equal to zero in the connection position and is decreasing during the approaching of the switching device to the connection position. In this case, the vibrations amplitude is limited by the vibration-limiting device substantially to zero in the connection position.

Of course, as will be also clear to the skilled person, according to a still another possible embodiment, the vibrating limiting device 7 can alternatively be integrally coupled to a stationary conducting terminal 6 of the switchgear 5 instead of to a movable conducting terminal 2 of the switching device 3, as discussed above. According to this embodiment, in case of vibration of the switching device, the vibration-limiting device, which in this case is not vibrating being coupled to the switchgear, interferes with the vibrating movable conducting terminal of the switching device thereby limiting the amplitude of such vibrations. Analogously to what described with reference to the embodiments shown in the Figures, also according to this alternative arrangement the movable conducting terminal can comprises an end cavity having an inner diameter/inner dimensions and the vibration-limiting device can comprise a cylindrical portion having an external diameter (or a portion having one or more dimensions) smaller than the movable conducting terminal end cavity inner diameter/inner dimensions, such that the vibration-limiting device cylindrical portion/portion is at least partially housed within the movable conducting terminal end cavity in the connection position.

Still alternatively, the vibration-limiting device can comprise a portion having a cylindrical end cavity having an inner diameter (or a cavity having one or more inner dimensions) greater than the external diameter (or external one or more dimensions) of the corresponding movable conducting terminal, such that the movable conducting terminal can be at least partially housed within said vibration-limiting device end cavity in the connection position.

The vibration-limiting device 7 is preferably separated and connectable to one movable conducting terminal or to one stationary conducting terminal. For example, the vibration-limiting device 7 can comprise a threaded portion 10 which can be screwed into the end cavity of the terminal (for example an end cavity 15 of the movable conducting terminal 2, if the vibration-limiting device is coupled to the latter), which is correspondingly threaded (FIG. 4) The threaded portion 10 is preferably opposite to the before mentioned cylindrical portion 8. In order to render the screwing easier, the portion 8 can comprise one or more slots 11 for allowing screwing by means of a suitable tool.

Figure 4:
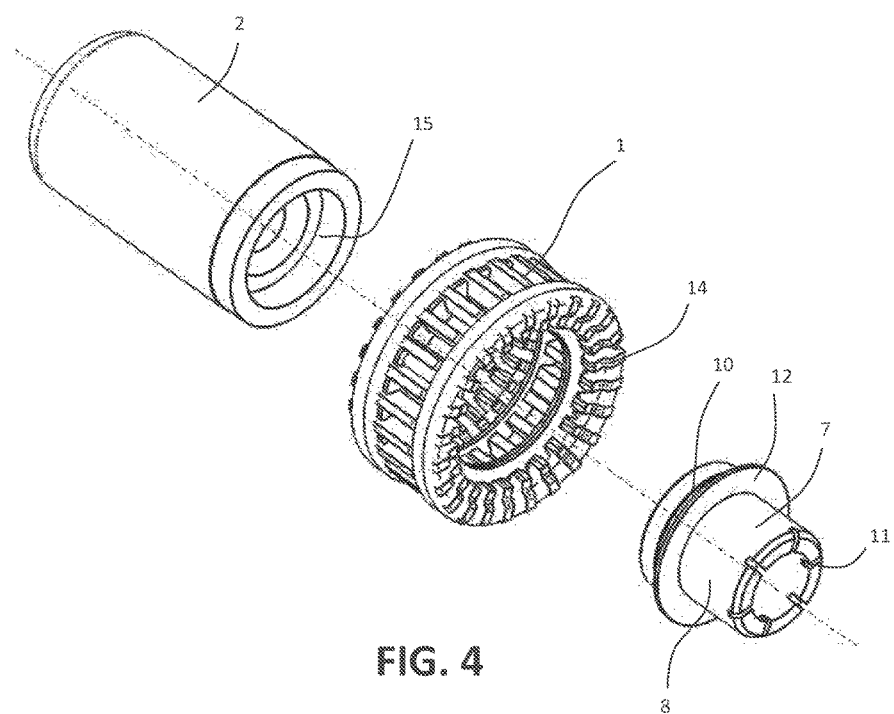
FIG. 4 is an exploded perspective view of the conducting terminal in FIG. 3.
Figure 5A:
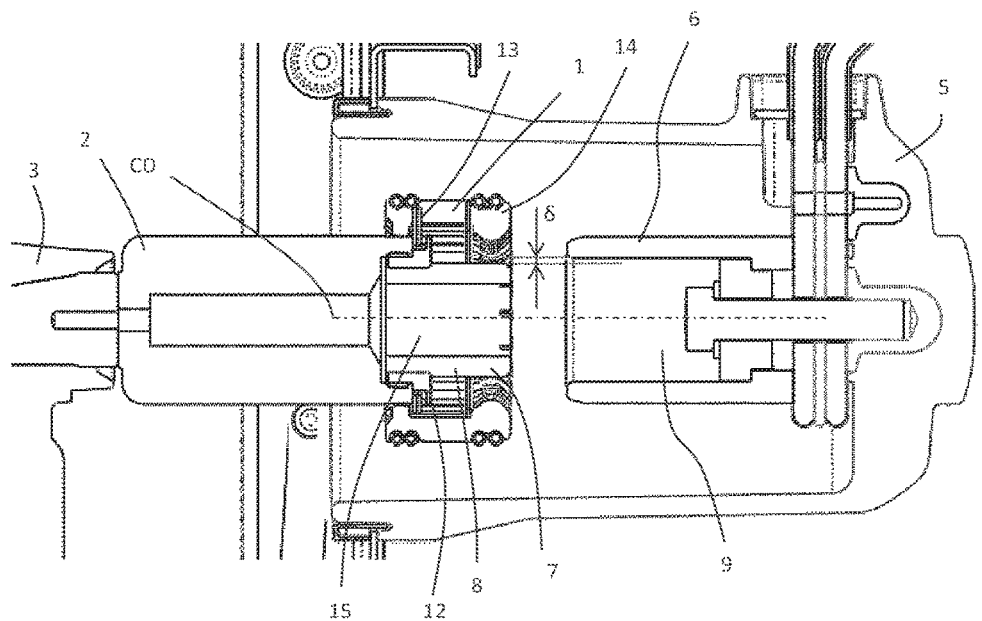
FIGS. 5a and 5b are side partially sectional views of a circuit breaker provided with a vibration-limiting device according to the invention and a switchgear, respectively in a disconnected configuration and in a connected configuration.
Figure 5B:
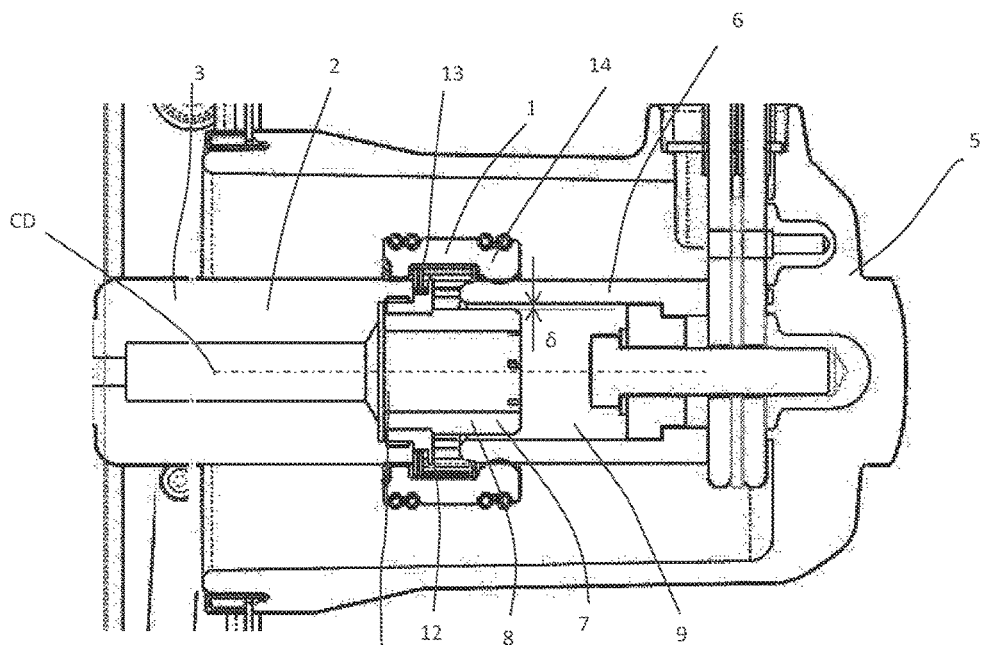

Advantageously, the vibration-limiting device 7 comprises means for locking the contact-assembly 1, in particular the tulip contact assembly 1, to the movable conducting terminal 2 (or to the stationary conducting terminal 6 if the contact assembly and the vibration limiting device are associated to the latter) when the vibration-limiting device 7 is connected to the same. For example, the vibration-limiting device 7 can comprise an annular portion 12 extending circumferentially forming an abutment portion suitable to interact with a corresponding radially internal protruding portion 13 of the tulip contact assembly, such that when the vibrating limiting device 7 is screwed into the contact end cavity, the contact-assembly 1 is urged against the same contact (FIGS. 4-5).

According to still another possible embodiment not shown in the Figures, the vibration-limiting device 7 is a portion of the contact assembly 1, for example of the tulip contact assembly, i.e. is not an element separated from the latter. In this manner, the contact assembly 1 and the vibration-limiting device 7 can be connected together to a stationary or to a movable conducting terminal through the threaded portion 10, and the vibration-limiting device 7 can act for limiting the switching device vibrations as described above, for example through the cylindrical portion 8.

According to still another possible embodiment not shown in the Figures, the vibration-limiting device 7 is a portion of (i.e. is an element not separable from) the movable conducting terminal 2 or of the stationary conducting terminal 6. Preferably, the vibration-limiting device 7 is made of an electrically non-conductive material.

From the above description, the skilled person can appreciate how the vibrations due to the Lorenz forces both on the contact assembly and among the poles can be reduced thanks to the presence of the vibration-limiting device.

The skilled person will further appreciate that it is possible to modify an existing apparatus comprising a switchgear and a switching device by simply adding a vibration limiting device, thereby increasing the performances thereof in terms of short circuit currents that can be supported. No further changes in the features and in the dimensions of the switchgear and of the switching device are necessary.

Furthermore, the skilled person will appreciate that the racking-in phase and in particular the racking-in force is not affected by the presence of the vibration-limiting device.

To the above-described embodiments, the skilled person, in order to meet specific current needs, can make several additions, modifications, or substitutions of elements with other operatively equivalent elements, without however departing from the scope of the appended claims.

The invention claimed is:

1. An apparatus comprising a switchgear having at least one couple of stationary conducting terminals and a switching device having at least one couple of corresponding movable conducting terminals, wherein the switching device is movable with respect to the switchgear along a connection/disconnection direction (CD) between a connection position, wherein the switching device is electrically and mechanically connected to the switchgear by engagement of the movable conducting terminals with the corresponding stationary contacting terminals through contact assemblies coupled either to the movable conducting terminals or to the stationary conducting terminals, and a disconnection position, wherein the switching device and the switchgear are electrically and mechanically disconnected, at least one vibration-limiting device integrally coupled to either one movable conducting terminal of said at least one couple of movable conducting terminals or to one corresponding stationary conducting terminal of said at least one couple of stationary conducting terminals and conformed such that:

when the switching device is approaching the connection position moving along said connection/disconnection direction (CD), the vibration-limiting device does not interfere with the other of the one movable conducting terminal or the one corresponding stationary conducting terminal;

when the switching device is in the connection position, in case of vibrations of the one movable conducting terminal transversal to said connection/disconnection direction (CD), the vibration-limiting device interferes with the other of the one movable conducting terminal or the one corresponding stationary conducting terminal so to limit a vibrations amplitude;

wherein the vibration-limiting device is made of an electrically non-conductive material.

2. The apparatus according to claim 1, wherein the vibration-limiting device is integrally coupled to one movable conducting terminal of said at least one couple of movable conducting terminals and is configured so to interfere with the corresponding stationary conducting terminal of said at least one couple of stationary conducting terminals when the switching device is in the connection position in case of vibrations of said one movable conducting terminal transversal to said connection/disconnection direction (CD).

3. The apparatus according to claim 2, wherein said corresponding stationary conducting terminal comprises an end cavity having an inner dimension and the vibration-limiting device comprises a portion having an external dimension smaller than said stationary conducting terminal end cavity inner dimension, such that in the connection position said vibration-limiting device portion is at least partially housed within said stationary conducting terminal end cavity, such that the vibration-limiting device forms a gap ($\delta$) with the stationary conducting terminal such that there is no contact between the vibration-limiting device and the stationary conducting terminal.

4. The apparatus according to claim 2, wherein said corresponding stationary conducting terminal has an external dimension and the vibration-limiting device comprises a portion having an end cavity having an inner dimension greater than said stationary conducting terminal external dimension, such that in the connection position said stationary conducting terminal is at least partially housed within said vibration-limiting device end cavity, such that the vibration-limiting device forms a gap ($\delta$) with the stationary conducting terminal such that there is no contact between the vibration-limiting device and the stationary conducting terminal.

5. The apparatus according to claim 1, wherein the vibration-limiting device is integrally coupled to one stationary conducting terminal of said at least one couple of stationary conducting contacts and is configured so to interfere with the corresponding movable conducting terminal of said at least one couple of movable conducting terminals when the switching device is in the connection position in case of vibrations of the corresponding movable conducting terminal transversal to said connection/disconnection direction (CD).

6. The apparatus according to claim 5, wherein said corresponding movable conducting terminal comprises an end cavity having an inner dimension and the vibration-limiting device comprises a portion having an external dimension smaller than said movable conducting terminal end cavity inner dimension, such that in the connection position said vibration-limiting device portion is at least partially housed within said movable conducting terminal end cavity, such that the vibration-limiting device forms a gap ($\delta$) with the movable conducting terminal such that there is no contact between the vibration-limiting device and the movable conducting terminal.

7. The apparatus according to claim 5, wherein said corresponding movable conducting terminal has an external dimension and the vibration-limiting device comprises a portion having an end cavity having an inner dimension greater than said corresponding movable conducting terminal external dimension, such that in the connection position said corresponding movable conducting terminal is at least partially housed within said vibration-limiting device end cavity, such that the vibration-limiting device forms a gap ($\delta$) with the movable conducting terminal such that there is no contact between the vibration-limiting device and the movable conducting terminal.

8. The apparatus according to claim 1, wherein said vibration-limiting device is separated from and connectable in an integral manner to said one movable conducting terminal or said stationary conducting terminal (6).

9. The apparatus according to claim 8, wherein said vibration-limiting device is separated from the contact assembly coupled to the respective movable or stationary conducting terminal and locks said contact assembly to said respective movable or stationary conducting terminal when the vibration-limiting device is connected to said respective movable or stationary conducting terminal.

10. The apparatus according to claim 8, wherein said vibration-limiting device is a portion of said contact assembly.

11. The apparatus according to claim 1, wherein the vibration-limiting device is a portion of said one movable conducting terminal or of said one stationary conducting terminal.

12. The apparatus according to claim 1, wherein said contact assembly is a tulip contact assembly or a gripper contact assembly.

13. A vibration-limiting device integrally couplable to either one movable conducting terminal of at least one couple of movable conducting terminals of a switching device or to one corresponding stationary conducting terminal of at least one couple of stationary conducting terminals of a switchgear, wherein the switching device is movable with respect to the switchgear along a connection/disconnection direction (CD) between a connection position, in which the switching device is electrically and mechanically connected to the switchgear by engagement of the movable contacting terminals with the corresponding stationary contacting terminals through respective contact assemblies coupled either to the movable conducting terminals or to the corresponding stationary conducting terminals, and a disconnection position, wherein the switching device and the switchgear are electrically and mechanically disconnected to the switchgear, wherein the vibration-limiting device is conformed such that:
when the switching device is approaching the connection position moving along said connection/disconnection direction, the vibration-limiting device does not interfere with the other of the one movable conducting terminal or the corresponding one stationary conducting terminal;
when the switching device is in the connection position, in case of vibrations of the one movable conducting terminal transversal to said connection/disconnection direction, the vibration-limiting device interferes with the other of the one movable conducting terminal or the corresponding one stationary conducting terminal so to limit a vibrations amplitude;

wherein the vibration-limiting device is made of an electrically non-conductive material.

14. The vibration-limiting device according to claim 13, comprising a portion suitable to be inserted into an end cavity having an inner dimension of either said one movable conducting terminal or of said corresponding one stationary conducting terminal, wherein said vibration-limiting device portion has an external dimension smaller than said end cavity dimension, such that said vibration-limiting device portion can be at least partially housed within said end cavity in the connection position, such that the vibration-limiting device can form a gap ($\delta$) with the stationary conducting terminal or with the movable conducting terminal such that there is no contact between the vibration-limiting device and the stationary or movable conducting terminal.

15. The vibration-limiting device according to claim 13, comprising a portion having an end cavity having an inner dimension greater than an external dimension of said one movable or stationary conducting terminal, such that said one movable or said one stationary conducting terminal can be at least partially housed within said vibration-limiting device end cavity in the connection position, such that the vibration-limiting device can form a gap ($\delta$) with the stationary conducting terminal or with the movable conducting terminal such that there is no contact between the vibration-limiting device and the stationary or movable conducting terminal.

16. The vibration-limiting device according to claim 13, wherein the vibration-limiting device locks said contact assembly to said movable or stationary conducting terminal when the vibration-limiting device is connected to said one movable or stationary conducting terminal.

17. A contact-assembly comprising a vibration-limiting device according to claim 13.

18. The apparatus according to claim 2, wherein said vibration-limiting device is separated from and connectable in an integral manner to said one movable conducting terminal or said stationary conducting terminal.

19. The apparatus according to claim 18, wherein said vibration-limiting device is separated from the contact assembly coupled to the respective movable or stationary conducting terminal and locks said contact assembly to said respective movable or stationary conducting terminal when the vibration-limiting device is connected to said respective movable or stationary conducting terminal.

20. The apparatus according to claim 2, wherein the vibration-limiting device is a portion of said one movable conducting terminal or of said one stationary conducting terminal.

* * * * *